J. HUEBNER.
METHOD OF MAKING INNER TIRES FOR VEHICLES.
APPLICATION FILED JULY 12, 1916.
1,260,384.
Patented Mar. 26, 1918.
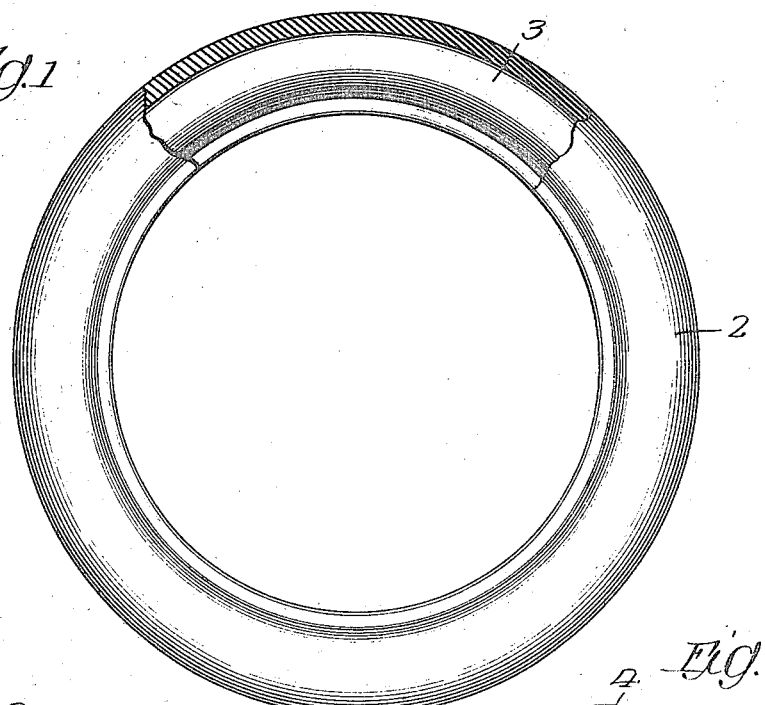
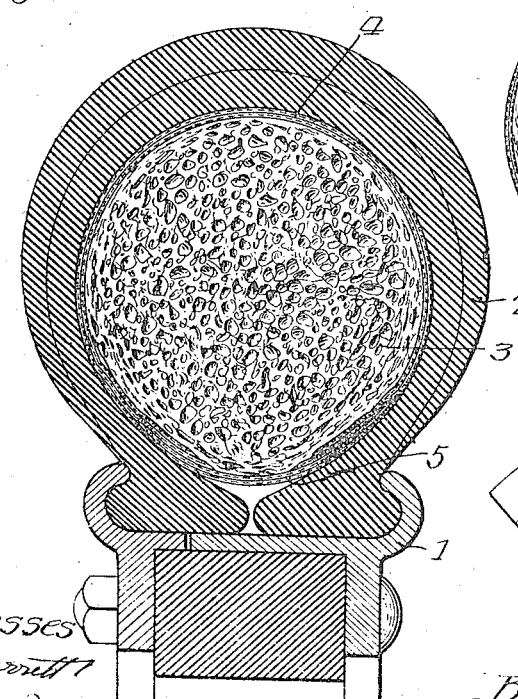
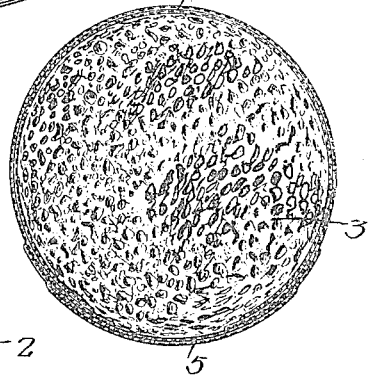
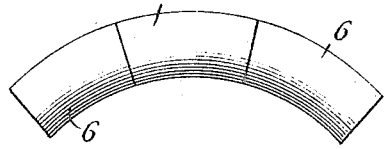
Witnesses
Inventor
Josef Huebner
By Wm O Bell
Atty.

UNITED STATES PATENT OFFICE.

JOSEF HUEBNER, OF MILWAUKEE, WISCONSIN, ASSIGNOR TO PAN-AMERICAN RUBBER CO., OF MILWAUKEE, WISCONSIN, A CORPORATION OF WISCONSIN.

METHOD OF MAKING INNER TIRES FOR VEHICLES.

1,260,384.     Specification of Letters Patent.     Patented Mar. 26, 1918.

Application filed July 12, 1916. Serial No. 108,817.

*To all whom it may concern:*

Be it known that I, JOSEF HUEBNER, a subject of the Emperor of Germany, residing at Milwaukee, in the county of Milwaukee and State of Wisconsin, have invented new and useful Improvements in Methods of Making Inner Tires for Vehicles, of which the following is a specification.

This invention relates to vehicle tires and has for its primary object the provision of a highly resilient and durable tire adapted to replace pneumatic tires and to eliminate the inherent defects of such tires, yet preserve and enhance the desirable qualities thereof.

A further object of my invention is the provision of a method of making inner tires of a rubber compound treated to produce a structure having a multiplicity of closed cells filled with a gaseous medium and vulcanized to permanently preserve the tire in the desired form.

Further objects and advantages of my invention will be apparent as it is better understood by reference to the following specification when read in connection with the accompanying drawing illustrating the preferred embodiment thereof, in which—

Figure 1 is a side elevation, partially in section, of a tire according to my invention;

Fig. 2 is an enlarged transverse section through the tire and rim;

Fig. 3 is an enlarged transverse section through the inner tire; and

Fig. 4 is a detail in elevation of a slightly different form of my invention.

The inner tire is made from a rubber compound to which certain volatile and preservative ingredients have been added. The volatile ingredients cause the rubber when heated under suitable conditions to expand and assume a cellular structure, the cells of which are filled with a gaseous medium and the preservative ingredient maintains the moist condition of the rubber after vulcanization and insures its life for an indefinite period.

Preferably the material is prepared as follows, it being understood that the description is illustrative and that changes may be made in the various ingredients and the relative proportions thereof without departing from the spirit and scope of the invention. In producing the compound I employ by weight substantially the following proportions of ingredients; viz., sixty (60) parts rubber gum, five (5) parts resin oil, ten (10) parts zinc oxid, ten (10) parts spirits of turpentine, five (5) parts flour of sulfur and ten (10) parts ammonium carbonate.

In mixing these ingredients I first add to the rubber gum, which has been theretofore worked through the usual rolls to primarily produce a dough, the said resin oil and after this has been added the said gum or dough is again passed through the rolls repeatedly until the resin oil has been thoroughly distributed through the mass in a fully divided state. I then add the zinc oxid which is also similarly distributed through the mass by working the gum again through the rolls repeatedly. The operation is successively repeated after adding turpentine, flour of sulfur and ammonium carbonate in the order named. The resulting compound is rolled into a flat sheet substantially one-quarter inch in thickness and is ready for the succeeding operations.

The operator, after trimming the sheet to provide a straight edge, tightly rolls the sheet, or so much thereof as is necessary, into an elongated cylinder of a diameter slightly less than the desired diameter of the body of the finished inner tire. The cylinder is then cut to the exact length of the circumference of the finished inner tire and is covered with two layers of frictioned fabric of a width sufficient to almost surround the cylinder. Two relatively narrow layers of frictioned fabric are then disposed over the space between and overlapping the edges of the previously mentioned layers, the outer of said narrow layers being wider than the inner. The outer layer in each instance may be of heavier fabric than the inner.

The ends of the cylinder are then joined to form an annulus with the narrower strips of fabric on the inner periphery thereof and the annulus is placed in a suitable mold so constructed as to be gas tight and sufficiently strong to withstand the pressure generated during the subsequent treatment.

The mold is placed in a vulcanizing drum and subjected to heat by means of steam surrounding the mold. Primarily steam under substantially five (5) pounds pressure is admitted to the drum for a period of five (5) minutes, more or less. The pressure is then increased to ten (10) pounds and is maintained for ten (10) minutes, more or less. The pressure is gradually increased preferably five (5) pounds at a time and is maintained the same number of minutes as the pounds pressure indicated until thirty-five (35) pounds pressure, more or less, has been attained in the drum, this pressure being continuously maintained for one (1) hour and fifty (50) minutes, more or less, depending upon the size of the inner tire. The mold is removed when vulcanization is complete and is permitted to cool.

During the initial steps of heating which precede the vulcanization, the volatile ingredients of the rubber compound, consisting of turpentine and ammonium carbonate, are transformed into gas globules which expand and produce cells, the prolonged continuation of the heat at a point below that required for vulcanization giving the finely divided volatile matter time to become fully expanded before the rubber compound sets. At each increase of temperature the heat being applied through the mold housing, the outer cells expand first and it is essential, therefore, that each increased temperature be maintained sufficiently long for the heat to penetrate the rubber which would otherwise be unevenly expanded.

By subjecting the compound in the mold to a series of temporarily maintained and successively increased temperatures, (ranging from that required to volatilize the ammonium carbonate, or other vaporizable ingredients, to that required for vulcanization) and finally subjecting it for a longer time to a temperature sufficient to vulcanize the rubber, I produce rubber of uniform porosity and a tire of maximum resiliency.

The resin oil is a non-hardening and non-drying substance and when mixed with the rubber compound it prevents the rubber from becoming hard and brittle and otherwise deteriorating as is usual with compounds of this nature. Inner tires made from this material are uniformly and permanently elastic.

Referring to the drawing, 1 indicates a suitable rim to support the casing 2. Both the rim and casing may be of the usual and standard forms. The inner tire 3 of cellular rubber covered by wide layers 4 and narrow layers 5 of frictioned fabric vulcanized thereto is of the exact size required to fill the casing 2 when secured to the rim 1 and to maintain the casing 2 in a condition equivalent to the proper inflation of an inner tube.

While I have described my inner tire as an annulus it is obvious that it may be cut into or made up in sections 6 (Fig. 4) which are inserted in the casing 2 in exactly the same manner as the integral annular form previously described.

Tires constructed in accordance with my invention are not subject to puncture or blow-out and inasmuch as the tire is always maintained in condition equivalent to proper inflation rim cutting of the casing is impossible. Experience has demonstrated that my tires are more resilient than properly inflated pneumatic tires, thus saving the casing from wear and because of the impossibility of blow-outs the casing can be used much longer than with an inner tube. When worn out the casing can be discarded and a new casing substituted employing the same inner tire indefinitely.

Obviously various changes may be made in the character and proportion of the ingredients and the form and mode of constructing the inner tire without departing from the invention as claimed hereinafter or sacrificing any of the material advantages thereof, the foregoing specification being descriptive only of the preferred embodiments of my invention.

I claim:

1. A method of making inner tires for vehicles comprising mixing a vulcanizable rubber compound with an ingredient adapted to be transformed into a gaseous medium when heated, forming therefrom a flat sheet, rolling said sheet into an elongated cylinder of the desired dimensions, tightly wrapping said cylinder in a fabric cover, joining the free ends of said cylinder to form an annulus, subjecting said annulus in a suitable mold to heat sufficient to volatilize said ingredient and raising the temperature to a point sufficient to vulcanize the rubber.

2. A method of making inner tires for vehicles comprising mixing a vulcanizable rubber compound with an ingredient adapted to be transformed into a gaseous medium when heated, forming therefrom an elongated cylinder of the desired dimensions, tightly wrapping said cylinder in an elongated fabric cover extending longitudinally of said cylinder, joining the free ends of said cylinder to form an annulus, subjecting said annulus in a suitable mold to heat sufficient to volatilize said ingredient and raising the temperature to a point sufficient to vulcanize the rubber.

3. A method of making inner tires for vehicles comprising mixing a vulcanizable rubber compound with an ingredient adapted to be transformed into a gaseous medium when heated and with a material adapted to preserve the rubber from deterioration, forming therefrom a flat sheet, rolling said sheet into an elongated cylinder of the desired dimensions, tightly wrapping said cylinder in a fabric cover, joining the free ends of said cylinder to form an annulus and subjecting said annulus in a suitable mold to heat sufficient to volatilize said ingredient and raising the temperature to a point sufficient to vulcanize the rubber.

4. A method of making inner tires for vehicles comprising mixing a vulcanizable rubber compound with an ingredient adapted to be transformed into a gaseous medium when heated, and with a material adapted to preserve the rubber from deterioration, forming therefrom an elongated cylinder of the desired dimensions, tightly wrapping said cylinder in an elongated fabric cover extending longitudinally of said cylinder, joining the free ends of said cylinder to form an annulus, subjecting said annulus in a suitable mold to heat sufficient to volatilize said ingredient and raising the temperature to a point sufficient to vulcanize the rubber.

JOSEF HUEBNER.

Witnesses:
L. J. HOPMEIER,
ERNEST H. MERCHANT.